United States Patent
Bedikian et al.

(10) Patent No.: US 11,270,409 B1
(45) Date of Patent: Mar. 8, 2022

(54) VARIABLE-GRANULARITY BASED IMAGE WARPING

(71) Applicant: Apple Inc., Cupertino, CA (US)

(72) Inventors: Raffi A. Bedikian, Mountain View, CA (US); Mohamed Selim Ben Himane, Milpitas, CA (US); Pedro Manuel Da Silva Quelhas, Sunnyvale, CA (US); Moinul Khan, San Jose, CA (US); Katharina Buckl, Los Altos, CA (US); Jim C. Chou, San Jose, CA (US); Julien Monat Rodier, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/029,396

(22) Filed: Sep. 23, 2020

Related U.S. Application Data

(60) Provisional application No. 62/935,183, filed on Nov. 14, 2019.

(51) Int. Cl.
*G06T 3/00* (2006.01)
*G02B 27/01* (2006.01)
*G02B 27/00* (2006.01)
*H04N 13/117* (2018.01)

(52) U.S. Cl.
CPC ........ *G06T 3/0093* (2013.01); *G02B 27/0093* (2013.01); *G02B 27/017* (2013.01); *H04N 13/117* (2018.05)

(58) Field of Classification Search
None
See application file for complete search history.

(56) References Cited

U.S. PATENT DOCUMENTS

| | | | |
|---|---|---|---|
| 2018/0350032 A1* | 12/2018 | Bastani | G06T 15/20 |
| 2019/0188895 A1* | 6/2019 | Miller, IV | G06K 9/00604 |
| 2019/0204599 A1* | 7/2019 | Abbott | G06F 3/011 |

OTHER PUBLICATIONS

Author: Bal, Can; Title: Comparison of Depth Image-Based Rendering and Image Domain Warping in 3D Video Coding; Date: 2014; pp. 102; Source: https://escholarship.org/uc/item/55h973d0 (Year: 2014).*

* cited by examiner

*Primary Examiner* — Jwalant Amin
(74) *Attorney, Agent, or Firm* — Fernando & Partners, LLP

(57) ABSTRACT

A method includes obtaining an image via an image sensor. The method includes determining a first perceptual quality value that is associated with a first portion of the image. The method includes determining a first image perceptual quality warping function that is based on the first perceptual quality value and an image warping map. The first image perceptual quality warping function is characterized by a first warping granularity level that is a function of the first perceptual quality value. The method includes warping the first portion of the image according to the first image perceptual quality warping function.

22 Claims, 13 Drawing Sheets

VARIABLE-GRANULARITY BASED IMAGE WARPING

CROSS-REFERENCE TO RELATED APPLICATIONS

This application claims priority to U.S. Provisional Patent App. No. 62/935,183, filed on Nov. 14, 2019, which is hereby incorporated by reference in its entirety.

TECHNICAL FIELD

The present disclosure relates to warping an image, and, in particular, variable-granularity based image warping.

BACKGROUND

Certain display systems, such as a head-mountable device (HMD), include an integrated camera and display. The camera obtains image data of a physical environment, and the display displays the image data for a user to view. The image data is obtained with respect to a camera plane that is based on the camera's position within the HMD, whereas the image data is displayed with respect to a display plane that is based on the display's position within the HMD.

When the HMD is worn by a user, the camera and the display are spatially offset (e.g., horizontally or vertically displaced) from eyes of the user. Accordingly, the displayed image data exists in a display plane that is offset from an eye plane that is associated with the position of the user's eyes. This spatial offset between the eye plane and the display plane causes user discomfort (e.g., motion sickness) because the user's visual perception of the physical environment does not match a corresponding visual perception when the user is not wearing the HMD.

Attempting to use fixed warping across an image in these circumstances is problematic. A given display system has limited available system resources (e.g., processing power and bandwidth). Accordingly, warping all image content at the same resolution level results in a warped image whose resolution is limited by the available system resources. Moreover, for a mobile device, utilization of a large amount of available system resources for fixed image warping may result in high heat dissipation for the mobile device.

SUMMARY

In accordance with some implementations, a method is performed at an electronic device with one or more processors, a non-transitory memory, and an image sensor. The method includes obtaining an image via the image sensor. The method includes determining a first perceptual quality value that is associated with a first portion of the image. The method includes determining a first image perceptual quality warping function that is based on the first perceptual quality value and an image warping map. The first image perceptual quality warping function is characterized by a first warping granularity level that is a function of the first perceptual quality value. The method includes warping the first portion of the image according to the first image perceptual quality warping function.

In accordance with some implementations, an electronic device includes one or more processors, a non-transitory memory, and an image sensor. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

SUMMARY

Figure 1:
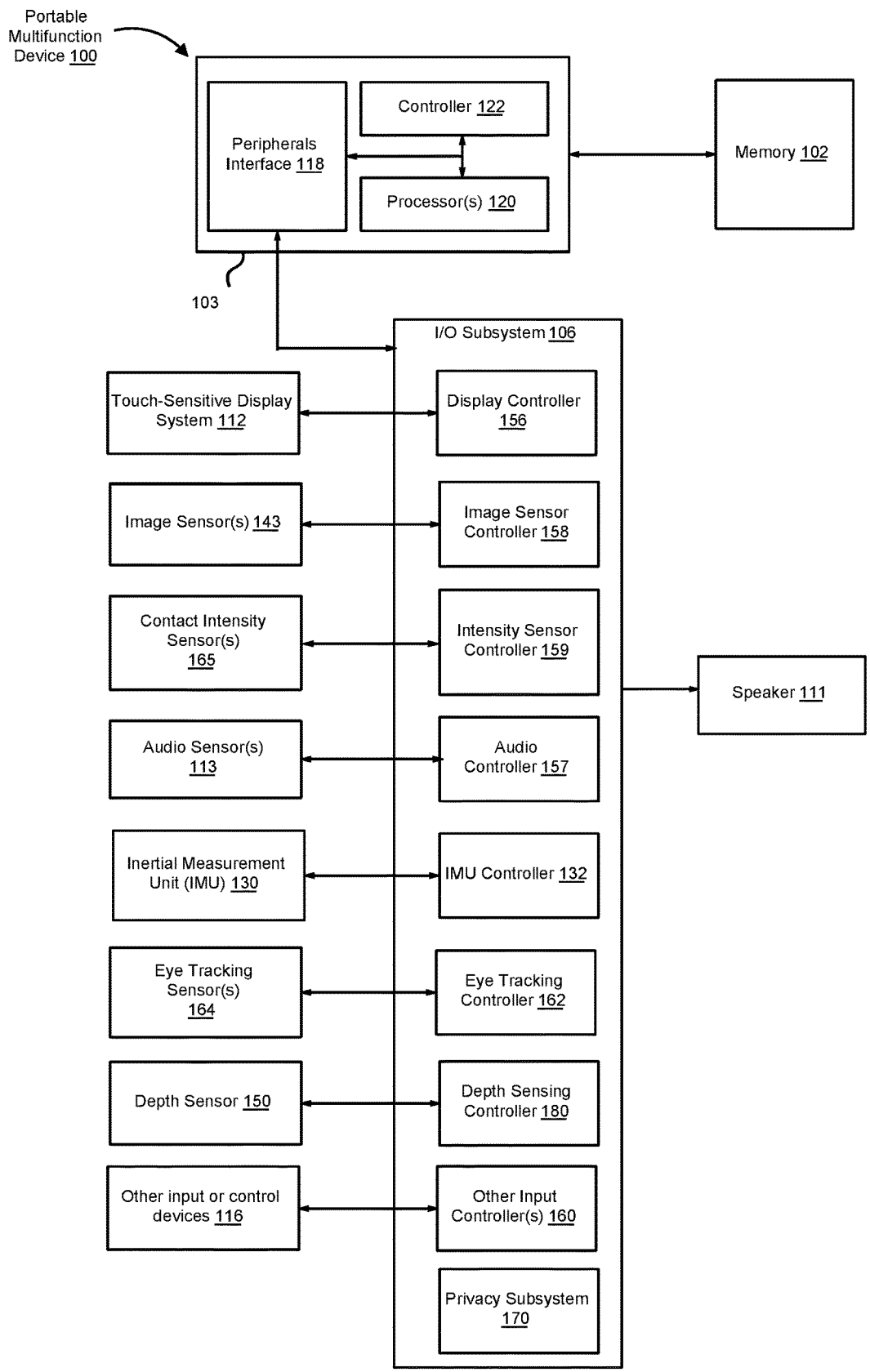
FIG. 1 is a block diagram of an example of a portable multifunction device in accordance with some implementations.

Certain display systems, such as a head-mountable device (HMD), include an integrated camera and display. The camera obtains image data of a physical environment, and the display displays the image data for a user to view. The image data is obtained with respect to a camera plane that is based on the camera's position within the HMD, whereas the image data is displayed with respect to a display plane that is based on the display's position within the HMD. When the HMD is worn by a user, the camera and the display are spatially offset (e.g., horizontally or vertically displaced) from eyes of the user. Accordingly, the displayed image data exists in a display plane that is offset from an eye plane that is associated with the position of the user's eyes. This spatial offset between the eye plane and the display plane causes user discomfort (e.g., motion sickness) because the user's visual perception of the physical environment does not match a corresponding visual perception when the user is not wearing the HMD. Attempting to use fixed warping across an image in these circumstances is problematic. A given display system has limited available system resources (e.g., processing power and bandwidth). Accordingly, warping all image content at the same resolution level results in a warped image whose resolution is limited by the available system resources. Moreover, for a mobile device, utilization of a large amount of available system resources for fixed image warping may result in high heat dissipation for the mobile device.

By contrast, various implementations disclosed herein provide methods, electronic devices, and systems that warp a portion of an image according to an image perceptual quality warping function associated with the portion of the image. The image perceptual quality warping function is based on a determined perceptual quality value that is associated with the portion of the image. Moreover, the image perceptual quality warping function is characterized by a warping granularity level that is a function of the perceptual quality value. For example, in some implementations, the perceptual quality value is relatively low because the portion of the image is in a user's peripheral vision and thus is being perceived with low visual acuity. Continuing with this example, the electronic device warps the portion of the image with a relatively low granularity level (e.g., at a low resolution), thereby saving processing resources. As another example, in some implementations, the perceptual quality value is relatively high because a portion of the image corresponds to an edge of an object (e.g., the edge of a bird's wing) within the image. Continuing with this example, the electronic device warps the portion of the image with a relatively high granularity level (e.g., at a high resolution) in order to enable display of the portion of the image with an appropriate level of detail (e.g., relatively high detail).

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical setting refers to a world with which various persons can sense and/or interact without use of electronic systems. Physical settings, such as a physical park, include physical elements, such as, for example, physical wildlife, physical trees, and physical plants. Persons can directly sense and/or otherwise interact with the physical setting, for example, using one or more senses including sight, smell, touch, taste, and hearing.

An enhanced reality (ER) setting, in contrast to a physical setting, refers to an entirely (or partly) computer-produced setting that various persons, using an electronic system, can sense and/or otherwise interact with. In ER, a person's movements are in part monitored, and, responsive thereto, at least one attribute corresponding to at least one virtual object in the ER setting is changed in a manner that is consistent with one or more physical laws. For example, in response to an ER system detecting a person looking upward, the ER system may adjust various audio and graphics presented to the person in a manner consistent with how such sounds and appearances would change in a physical setting. Adjustments to attribute(s) of virtual object(s) in an ER setting also may be made, for example, in response to representations of movement (e.g., voice commands).

A person may sense and/or interact with an ER object using one or more senses, such as sight, smell, taste, touch, and sound. For example, a person may sense and/or interact with objects that create a multi-dimensional or spatial acoustic setting. Multi-dimensional or spatial acoustic settings provide a person with a perception of discrete acoustic sources in multi-dimensional space. Such objects may also enable acoustic transparency, which may selectively incorporate audio from a physical setting, either with or without computer-produced audio. In some ER settings, a person may sense and/or interact with only acoustic objects.

Virtual reality (VR) is one example of ER. A VR setting refers to an enhanced setting that is configured to only include computer-produced sensory inputs for one or more senses. A VR setting includes a plurality of virtual objects that a person may sense and/or interact with. A person may sense and/or interact with virtual objects in the VR setting through a simulation of at least some of the person's actions within the computer-produced setting, and/or through a simulation of the person or her presence within the computer-produced setting.

Mixed reality (MR) is another example of ER. An MR setting refers to an enhanced setting that is configured to integrate computer-produced sensory inputs (e.g., virtual objects) with sensory inputs from the physical setting, or a representation of sensory inputs from the physical setting. On a reality spectrum, an MR setting is between, but does not include, a completely physical setting at one end and a VR setting at the other end.

In some MR settings, computer-produced sensory inputs may be adjusted based on changes to sensory inputs from the physical setting. Moreover, some electronic systems for presenting MR settings may detect location and/or orientation with respect to the physical setting to enable interaction between real objects (i.e., physical elements from the physical setting or representations thereof) and virtual objects. For example, a system may detect movements and adjust computer-produced sensory inputs accordingly, so that, for example, a virtual tree appears fixed with respect to a physical structure.

Augmented reality (AR) is an example of MR. An AR setting refers to an enhanced setting where one or more virtual objects are superimposed over a physical setting (or representation thereof). As an example, an electronic system may include an opaque display and one or more imaging sensors for capturing video and/or images of a physical setting. Such video and/or images may be representations of the physical setting, for example. The video and/or images are combined with virtual objects, wherein the combination is then displayed on the opaque display. The physical setting may be viewed by a person, indirectly, via the images and/or video of the physical setting. The person may thus observe the virtual objects superimposed over the physical setting. When a system captures images of a physical setting, and displays an AR setting on an opaque display using the captured images, the displayed images are called a video pass-through. Alternatively, a transparent or semi-transparent display may be included in an electronic system for displaying an AR setting, such that an individual may view the physical setting directly through the transparent or semi-transparent displays. Virtual objects may be displayed on the semi-transparent or transparent display, such that an individual observes virtual objects superimposed over a physical setting. In yet another example, a projection system may be utilized in order to project virtual objects onto a physical setting. For example, virtual objects may be projected on a physical surface, or as a holograph, such that an individual observes the virtual objects superimposed over the physical setting.

An AR setting also may refer to an enhanced setting in which a representation of a physical setting is modified by computer-produced sensory data. As an example, at least a portion of a representation of a physical setting may be graphically modified (e.g., enlarged), so that the modified portion is still representative of (although not a fully-reproduced version of) the originally captured image(s). Alternatively, in providing video pass-through, one or more sensor images may be modified in order to impose a specific viewpoint different than a viewpoint captured by the image sensor(s). As another example, portions of a representation of a physical setting may be altered by graphically obscuring or excluding the portions.

Augmented virtuality (AV) is another example of MR. An AV setting refers to an enhanced setting in which a virtual or computer-produced setting integrates one or more sensory inputs from a physical setting. Such sensory input(s) may include representations of one or more characteristics of a physical setting. A virtual object may, for example, incorporate a color associated with a physical element captured by imaging sensor(s). Alternatively, a virtual object may adopt characteristics consistent with, for example, current weather conditions corresponding to a physical setting, such as weather conditions identified via imaging, online weather information, and/or weather-related sensors. As another example, an AR park may include virtual structures, plants, and trees, although animals within the AR park setting may include features accurately reproduced from images of physical animals.

Various systems allow persons to sense and/or interact with ER settings. For example, a head mounted system may include one or more speakers and an opaque display. As another example, an external display (e.g., a smartphone) may be incorporated within a head mounted system. The head mounted system may include microphones for capturing audio of a physical setting, and/or image sensors for capturing images/video of the physical setting. A transparent or semi-transparent display may also be included in the head mounted system. The semi-transparent or transparent display may, for example, include a substrate through which light (representative of images) is directed to a person's eyes. The display may also incorporate LEDs, OLEDs, liquid crystal on silicon, a laser scanning light source, a digital light projector, or any combination thereof. The substrate through which light is transmitted may be an optical reflector, holographic substrate, light waveguide, optical combiner, or any combination thereof. The transparent or semi-transparent display may, for example, transition selectively between a transparent/semi-transparent state and an opaque state. As another example, the electronic system may be a projection-based system. In a projection-based system, retinal projection may be used to project images onto a person's retina. Alternatively, a projection-based system also may project virtual objects into a physical setting, for example, such as projecting virtual objects as a holograph or onto a physical surface. Other examples of ER systems include windows configured to display graphics, headphones, earphones, speaker arrangements, lenses configured to display graphics, heads up displays, automotive windshields configured to display graphics, input mechanisms (e.g., controllers with or without haptic functionality), desktop or laptop computers, tablets, or smartphones.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a touch-sensitive display system 112, an inertial measurement unit (IMU) 130, image sensor(s) 143 (e.g., a camera), contact intensity sensor(s) 165, audio sensor(s) 113 (e.g., microphone), a depth sensor 150, eye tracking sensor(s) 164 (e.g., included within a head-mountable device (HMD)), and other input or control device(s) 116. In some implementations, the electronic device 100 corresponds to one of a mobile phone, tablet, laptop, wearable computing device, head-mountable device (HMD), head-mountable enclosure (e.g. the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more CPUs 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the touch-sensitive display system 112 and the other input or control devices 116, with the peripherals interface 118. The I/O subsystem 106 optionally includes a display controller 156, an image sensor controller 158, an intensity sensor controller 159, an audio controller 157, an eye tracking controller 162, and one or more input controllers 160 for other input or control devices, and a privacy subsystem 170. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 160 are, optionally, coupled with any (or none) of the following: a keyboard, infrared port, Universal Serial Bus (USB) port, stylus, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a physical environment.

The touch-sensitive display system 112 provides an input interface and an output interface between the electronic device 100 and a user. The display controller 156 receives and/or sends electrical signals from/to the touch-sensitive display system 112. The touch-sensitive display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system 112 has a touch-sensitive surface, sensor, or set of sensors that accepts input from the user based on haptic and/or tactile contact. The touch-sensitive display system 112 and the display controller 156 (along with any associated modules and/or sets of instructions in the memory 102) detect contact (and any movement or breaking of the contact) on the touch-sensitive display system 112 and converts the detected contact into interaction with user-interface objects (e.g., one or more soft keys, icons, web pages or images) that are displayed on the touch-sensitive display system 112. In an example implementation, a point of contact between the touch-sensitive display system 112 and the user corresponds to a finger of the user or a stylus.

The touch-sensitive display system 112 optionally uses LCD (liquid crystal display) technology, LPD (light emitting polymer display) technology, or LED (light emitting diode) technology, although other display technologies are used in other implementations. The touch-sensitive display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system 112.

The user optionally makes contact with the touch-sensitive display system 112 using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) 143 corresponds to one or more HMD cameras. In some implementations, the image sensor(s) 143 includes one or more depth sensors. In some implementations, the image sensor(s) 143 includes a combination of a black-and-white (BW) camera and an infrared (IR) camera.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the back of the electronic device 100.

In some implementations, the depth sensor 150 is configured to obtain depth data, such as depth information characterizing an object within an obtained input image. For example, the depth sensor 150 corresponds to one of a structured light device, a time-of-flight device, and/or the like.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

In various implementations, the electronic device 100 includes a privacy subsystem 170 that includes one or more privacy setting filters associated with user information, such as user information included in the eye gaze data and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2:
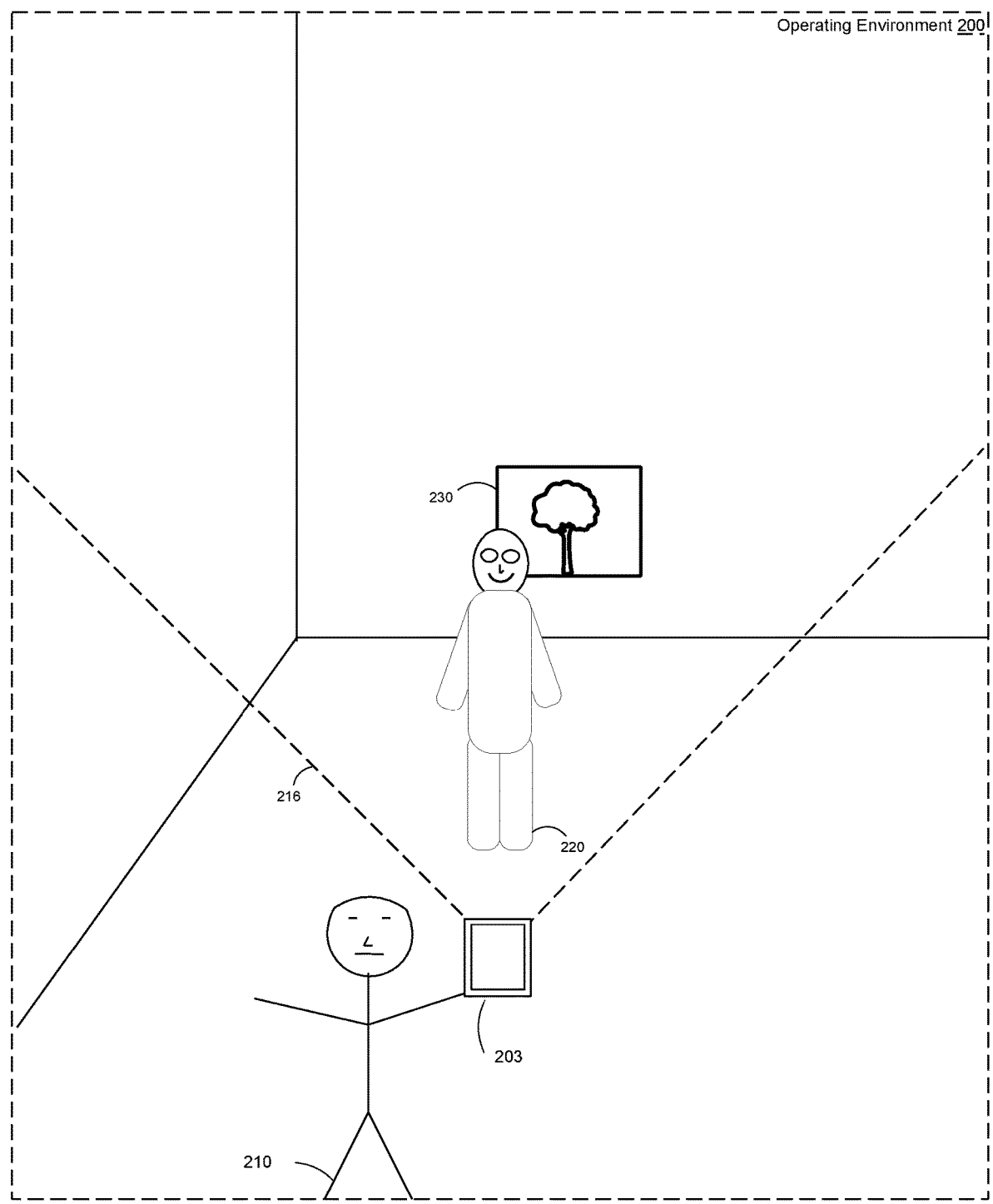
FIG. 2 is an example of an operating environment for variable-granularity based image warping in accordance with some implementations.

FIG. 2 is an example of an operating environment 200 for variable-granularity based image warping in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

The operating environment 200 includes an electronic device 203 being held by a user 210. In some implementations, the electronic device 203 corresponds to a mobile device, such as one of a smartphone, a tablet, a laptop, etc. The electronic device 203 includes an image sensor that is associated with a field of view 216 that includes an individual 220 and a painting 230 that is behind the individual 220 within the operating environment 200. For example, the electronic device 203 corresponds to a mobile device with a forward-facing camera having the field of view 216. Accordingly, the electronic device 203 obtains an image or a series of images (e.g., a video stream) including the individual 220 and the painting 230. According to various implementations disclosed herein, the electronic device 203 performs variable-granularity based image warping on the image, such as described below with respect to FIGS. 3A-3F and FIGS. 4A-4D.

FIGS. 3A-3F are an example of utilizing object identification within an operating environment 300 for variable-granularity based image warping in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

The operating environment 300 includes an electronic device 312 being worn by a user 310. The electronic device 312 includes a display device 314, such as a display panel integrated within a head-mountable device (HMD). The electronic device 312 includes an image sensor that is associated with a field of view 316 that includes an individual 320 and a painting 330 that is behind the individual 320 within the operating environment 300. Accordingly, the image sensor obtains an image or a series of images (e.g., a video stream) including the individual 320 and the painting 330.

In some implementations, the electronic device 312 corresponds to a mobile device, such as a smartphone, tablet, media player, laptop, etc. In some implementations, the electronic device 312 corresponds to an HMD that includes an integrated display (e.g., a built-in display) that displays the image. In some implementations, the HMD includes a head-mountable enclosure. In various implementations, the head-mountable enclosure includes an attachment region to which another device with a display can be attached. In various implementations, the head-mountable enclosure is shaped to form a receptacle for receiving another device that includes a display. For example, in some implementations, the electronic device 312 slides/snaps into or otherwise attaches to the head-mountable enclosure. In some implementations, the display of the device attached to the head-mountable enclosure presents (e.g., displays) the image. For example, in some implementations, the electronic device 312 corresponds to a mobile phone that can be attached to the head-mountable enclosure.

Figure 3A:
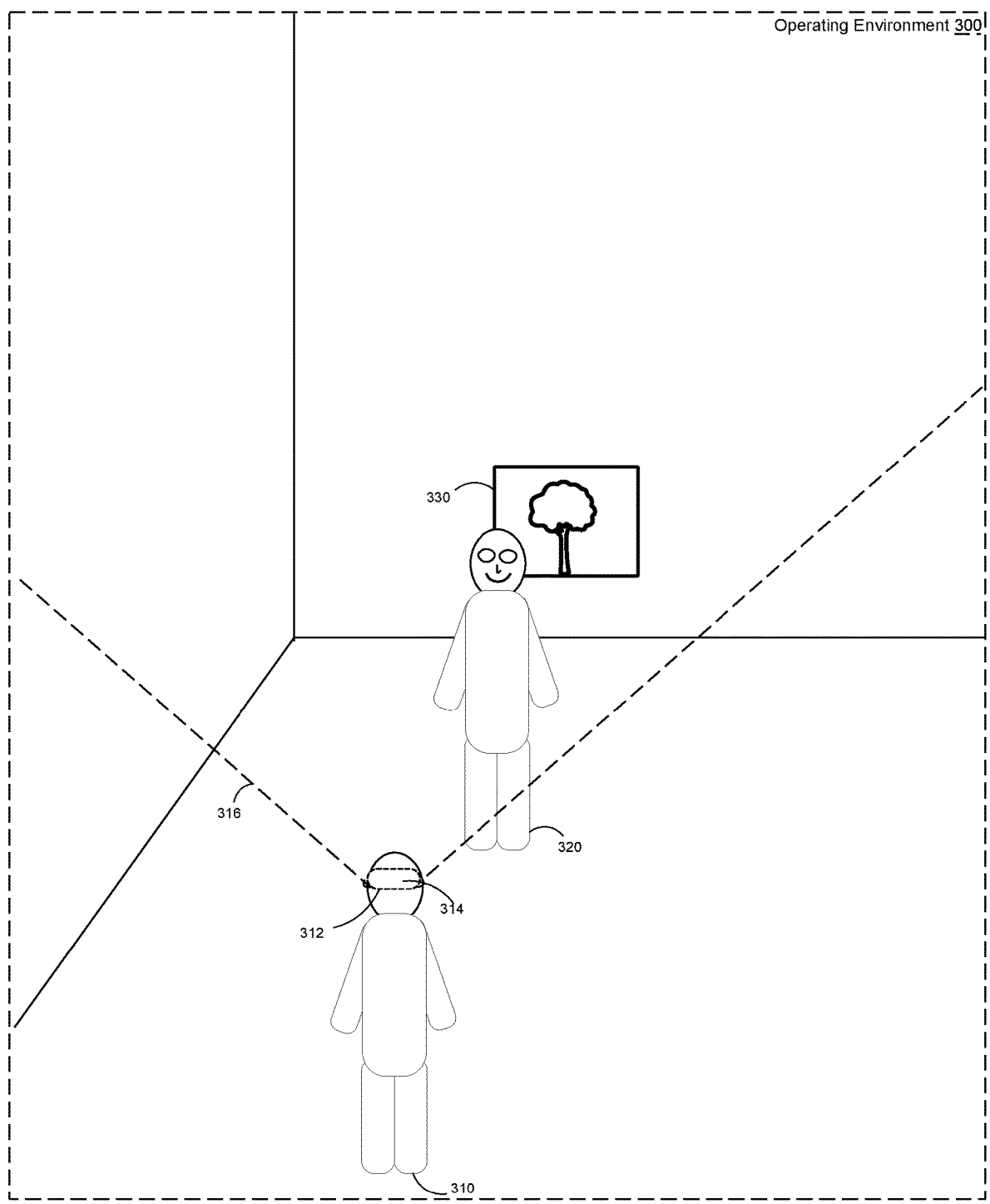
FIGS. 3A-3F are an example of utilizing object identification within an operating environment for variable-granularity based image warping in accordance with some implementations.
Figure 3B:
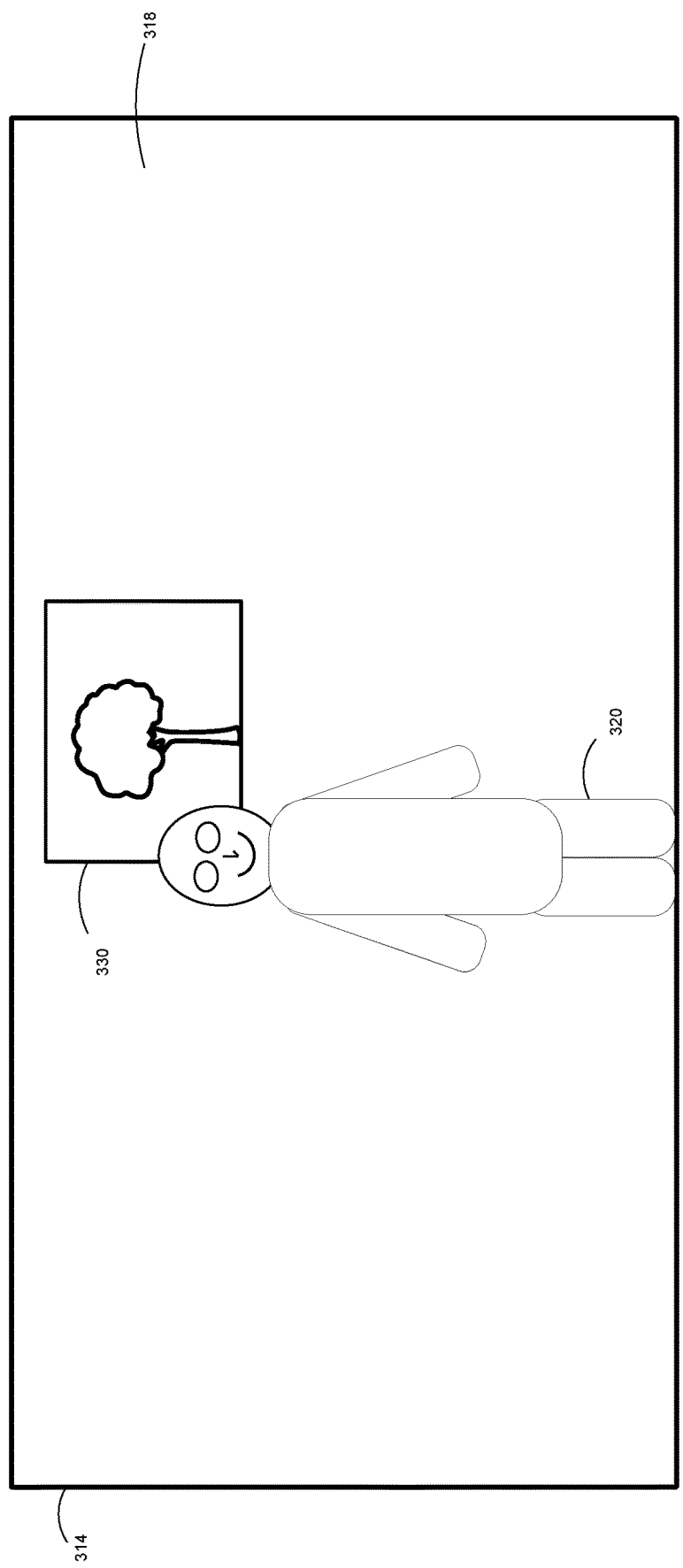

As illustrated in FIG. 3B, the display device 314 of the electronic device 312 displays an image 318 that is obtained via the image sensor. The image 318 includes the individual 320 and the painting 330.

Figure 3C:
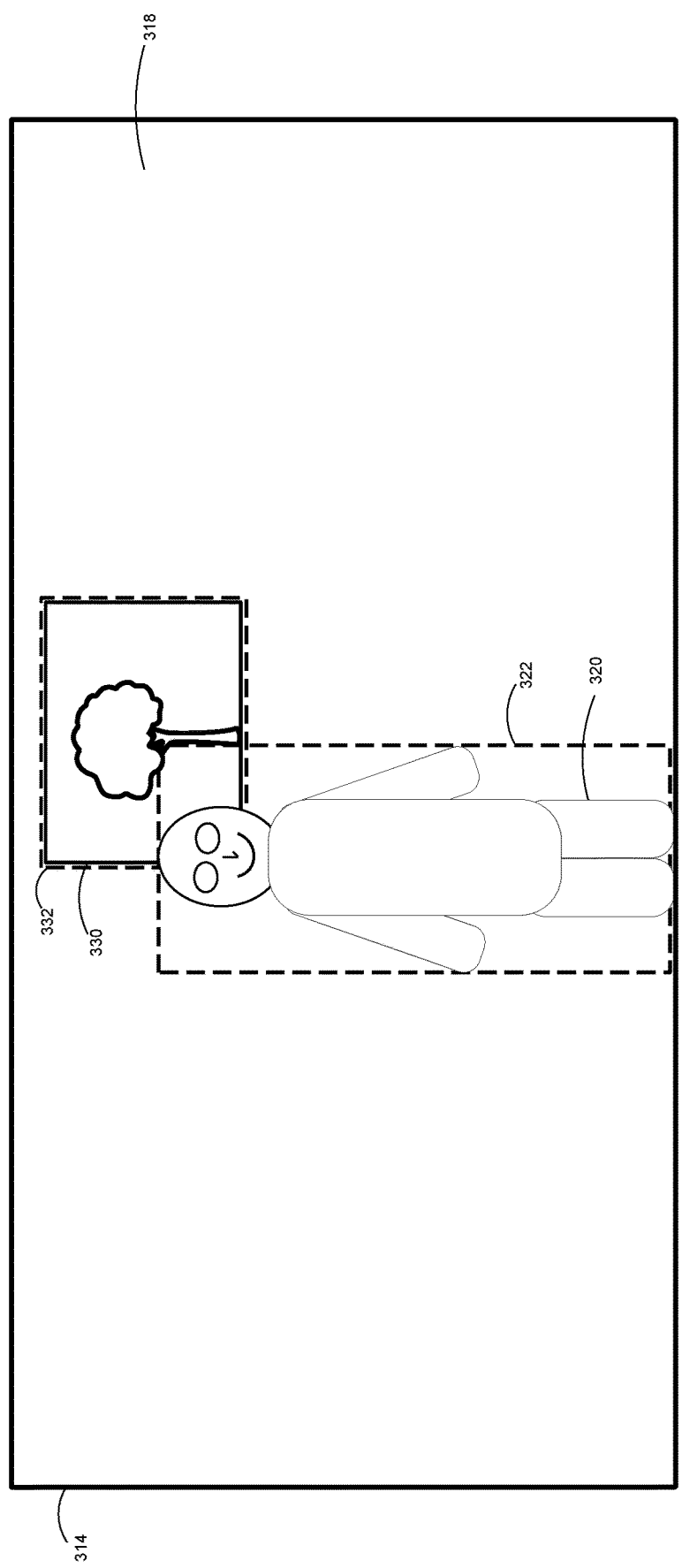

As illustrated in FIG. 3C, in some implementations, the electronic device 312 identifies objects within the image 318. The electronic device 312 identifies the individual 320, as is indicated by a first bounding box 322. Moreover, the electronic device 312 identifies the painting 330, as is indicated by a second bounding box 332. The first bounding box 322 and the second bounding box 332 are illustrated in FIG. 3C for purely explanatory purposes. In some implementations, the electronic device 312 identifies objects via instance segmentation, in which the objects are identified without a determination as to a meaning or an understanding of the objects, such as "Object No. 1," "Object No. 2," etc. In some implementations, the electronic device 312 identifies objects via semantic segmentation, in which respective semantic label values are determined for the objects, such as "individual" for the individual 320 and "painting" for the painting 330.

Figure 3D:
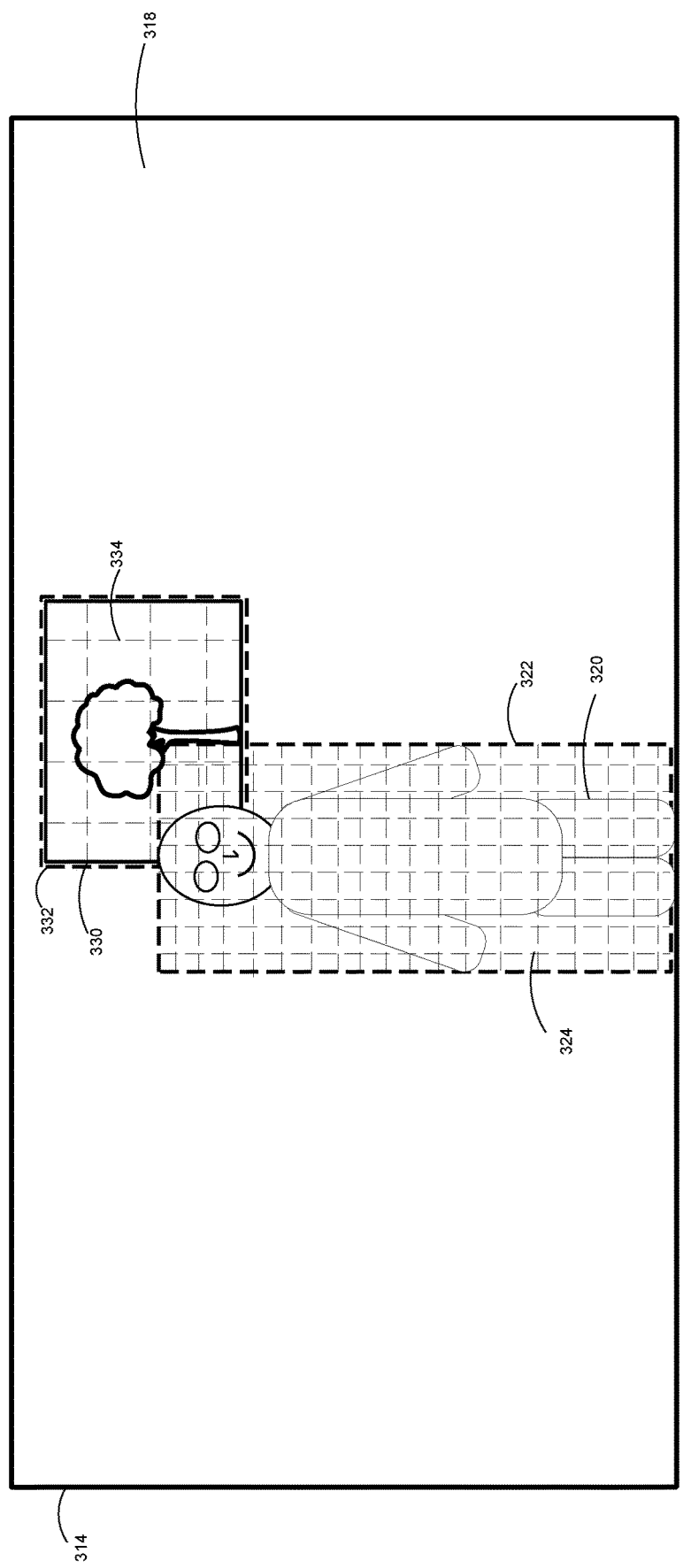

Based on the identified objects, in some implementations, the electronic device 312 determines perceptual quality values that are associated with portions of the image respectively associated with the objects. In some implementations, the electronic device 312 determines a first perceptual quality value for the individual 320 and a second perceptual quality value for the painting 330. The first perceptual quality value is associated with a first warping granularity level and the second perceptual quality value is associated with a second warping granularity level. As one example, the electronic device 312 determines the first perceptual quality value for the individual 320 that is higher than the second perceptual quality value for the painting 330. For example, the electronic device 312 assigns higher perceptual quality values to living objects (e.g., the individual 320) than to inanimate objects (e.g., the painting 330). Accordingly, as illustrated in FIG. 3D, a first warping granularity level 324 that, which is associated with the first perceptual quality value, is higher (e.g., finer grain) than a second warping granularity level 334, which is associated with the second perceptual quality value.

Figure 3E:
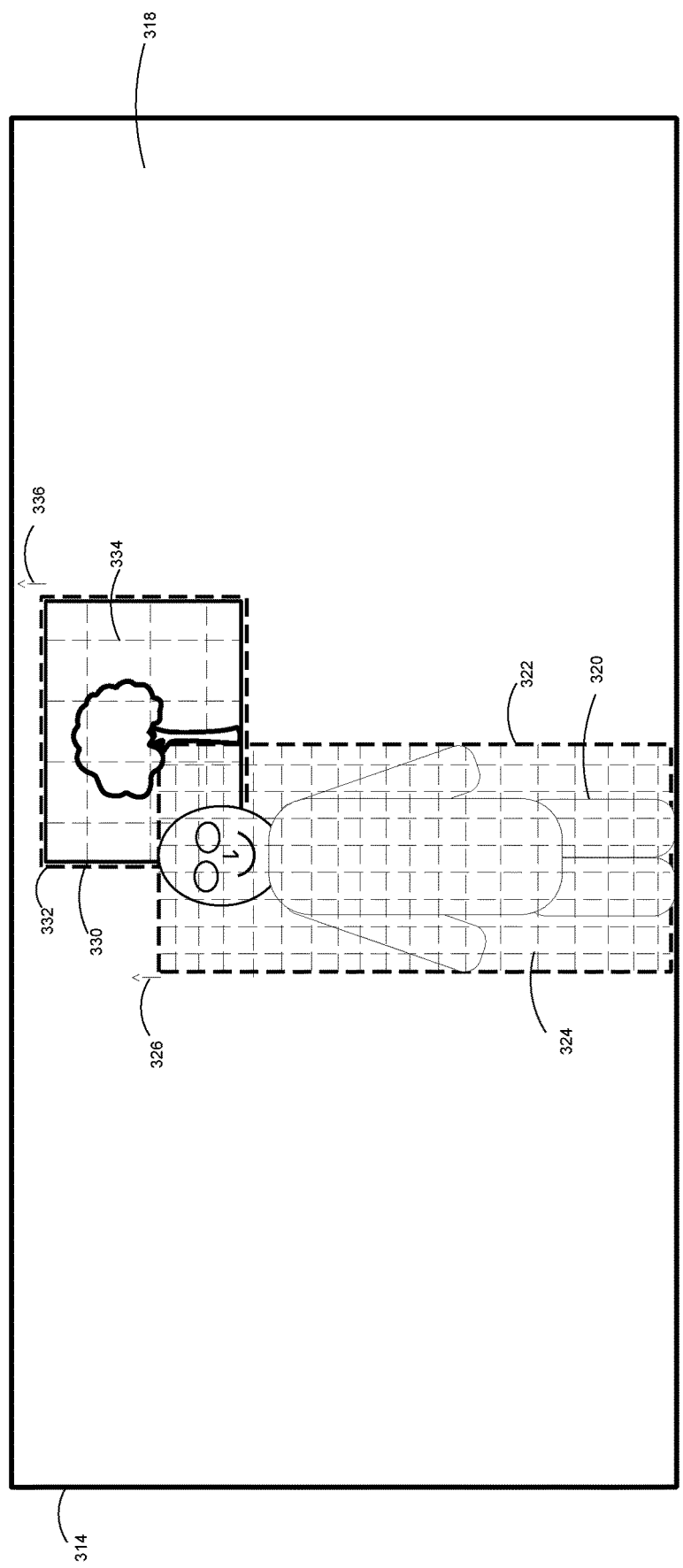

Based on the first and second perceptual quality values and an image warping map, the electronic device 312 determines an image perceptual quality warping function. In some implementations, the image warping map includes information that is utilized in order to correct an offset between the image sensor of the electronic device 314 and objects within the image 318 and/or an offset between eyes of the user 310 wearing the electronic device 312 and the display device 314. Accordingly, in some implementations, as illustrated in FIG. 3E, the electronic device 312 determines a first distance warp value 326 for the individual 320 and a second distance warp value 336 for the painting 330.

Figure 3F:
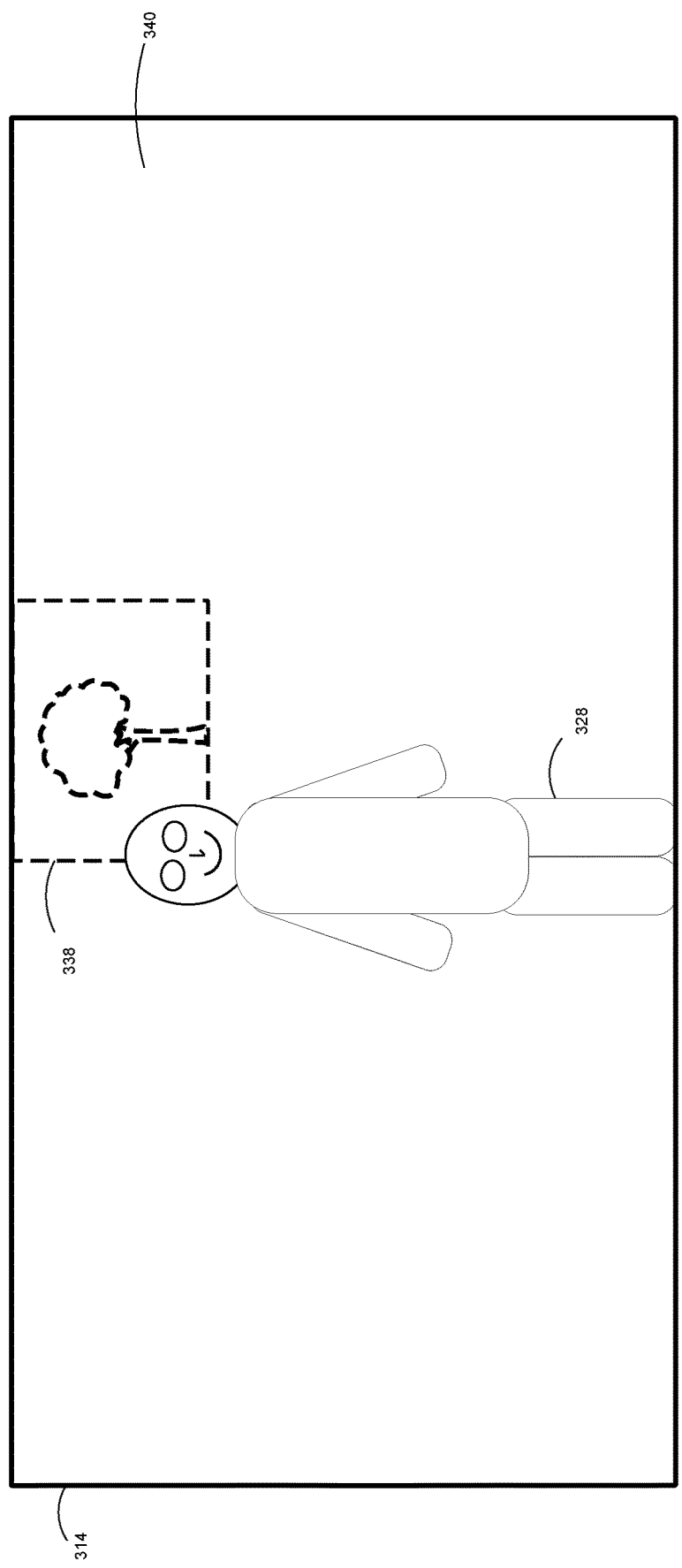

The electronic device 312 warps the image 318 according to the image perceptual quality warping function. For example, the electronic device 312 warps the image 318 according to the image perceptual quality warping function in order to generate a warped image 340, as illustrated in FIG. 3F. As compared with the individual 320 and the painting 330 in the image 318 in FIG. 3E, the warped image 340 includes a warped individual 328 that is moved upward according to the first distance warp value 326 and a warped painting 338 that is moved upward according to the second distance warp value 336, as is illustrated in FIG. 3F. Moreover, as illustrated in FIG. 3F, the electronic device 312 warps the individual 320 according to the first warping granularity level 324 that is higher than the second warping granularity level 334 used for warping the painting 330. Accordingly, the warped individual 328 has a higher resolution (e.g., more pixels) than the warped painting 338. As a result, the electronic device 312 utilizes fewer computational resources and less power than warping the entirety of the image at the same granularity level.

FIGS. 4A-4D are an example of utilizing eye gaze information with respect to an operating environment 400 for variable-granularity based image warping in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

The operating environment 400 includes an electronic device 412 being worn by a user 410. The electronic device 412 includes a display device 414 and an image sensor that is associated with a field of view 416 that includes a painting 420. The image sensor obtains an image or a series of images (e.g., a video stream) associated with the physical environment 400. In some implementations, the electronic device 412 corresponds to an HMD that includes an eye tracking sensor. According to various implementations, the eye tracking sensor obtains eye tracking information (e.g., eye gaze information or eye focus information) associated with the user 410.

Figure 4A:
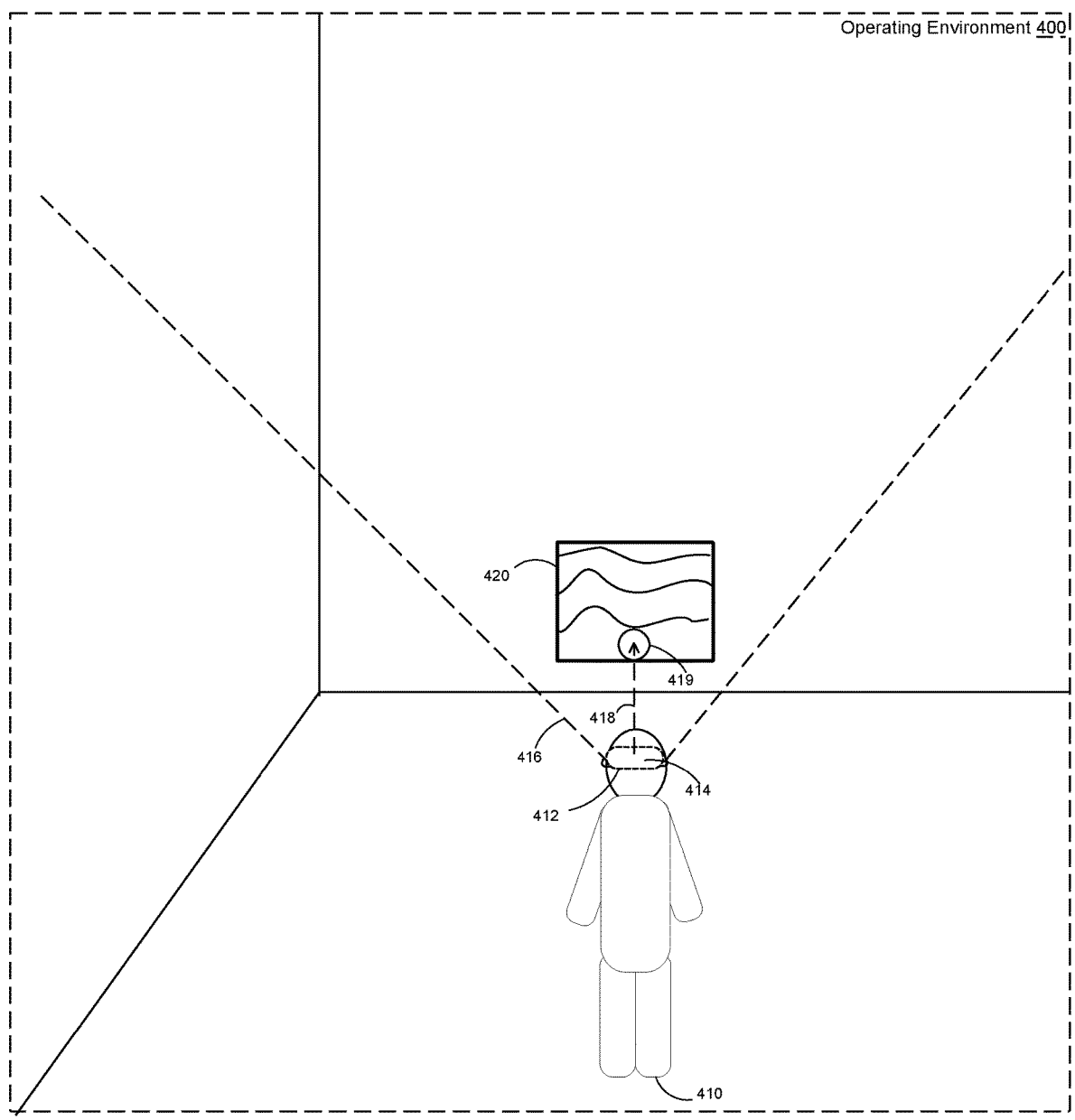
FIGS. 4A-4D are an example of utilizing eye gaze information with respect to an operating environment for variable-granularity based image warping in accordance with some implementations.

For example, the electronic device 412 obtains a gaze vector using the eye tracking sensor. As illustrated in FIG. 4A, the gaze vector characterizes a sightline 418 based on eye tracking values. For example, in some implementations, the sightline 418 corresponds to a line, in three-dimensional (3D) space, that runs along the gaze vector and intersects an area corresponding to eyes of the user 410, such as the center of the pupil of the eyes.

The electronic device 412 identifies, from the image and the sightline 418, a portion of the image associated with a region 419 where the sightline 418 intersects the image. The sightline 418 and the region 419 are illustrated for purely explanatory purposes.

Figure 4B:
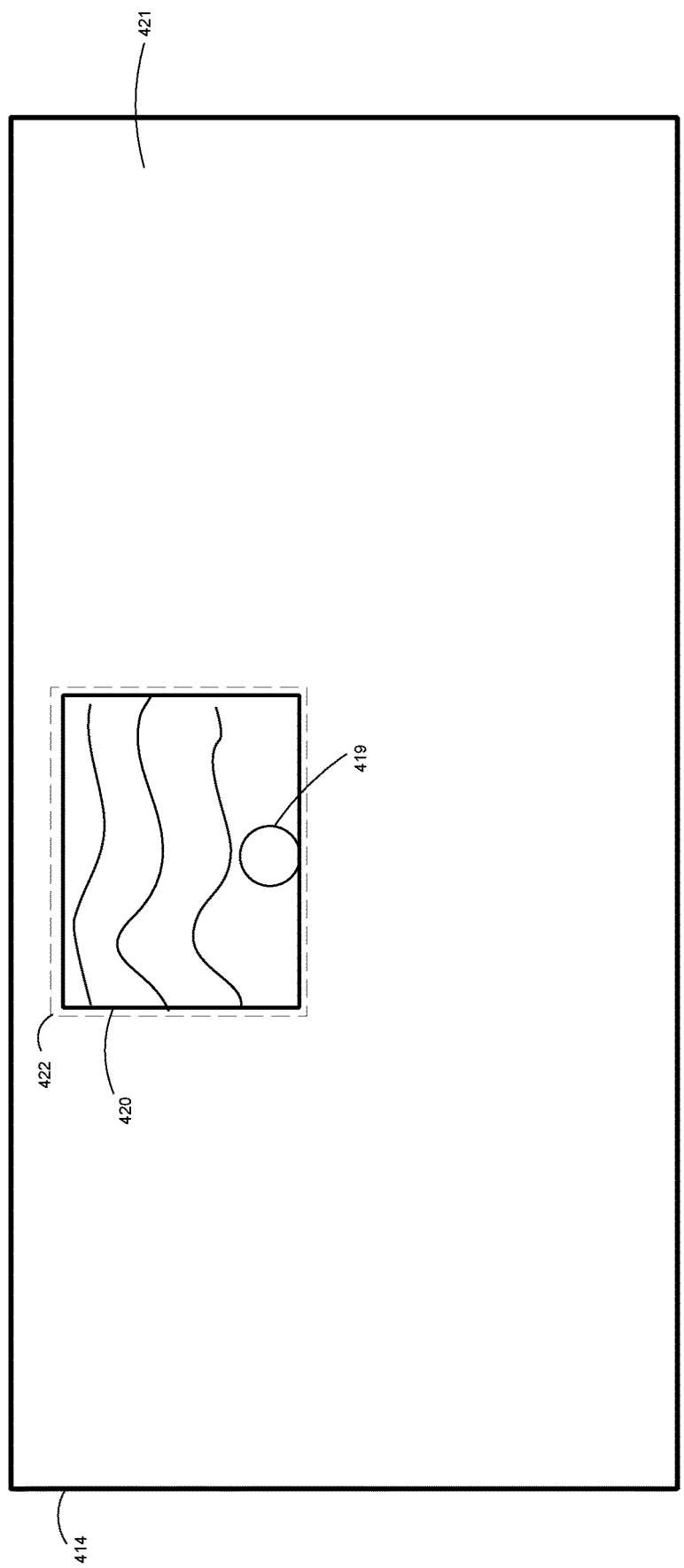

As illustrated in FIG. 4B, the display device 414 displays the image 421. In some implementations, the electronic device 412 identifies the painting 420 within the image 421, as is indicated by a bounding box 422, which is illustrated for purely explanatory purposes. According to various implementations, the electronic device 412 utilizes instance segmentation and/or semantic segmentation, as described above with reference to FIG. 3C.

Figure 4C:
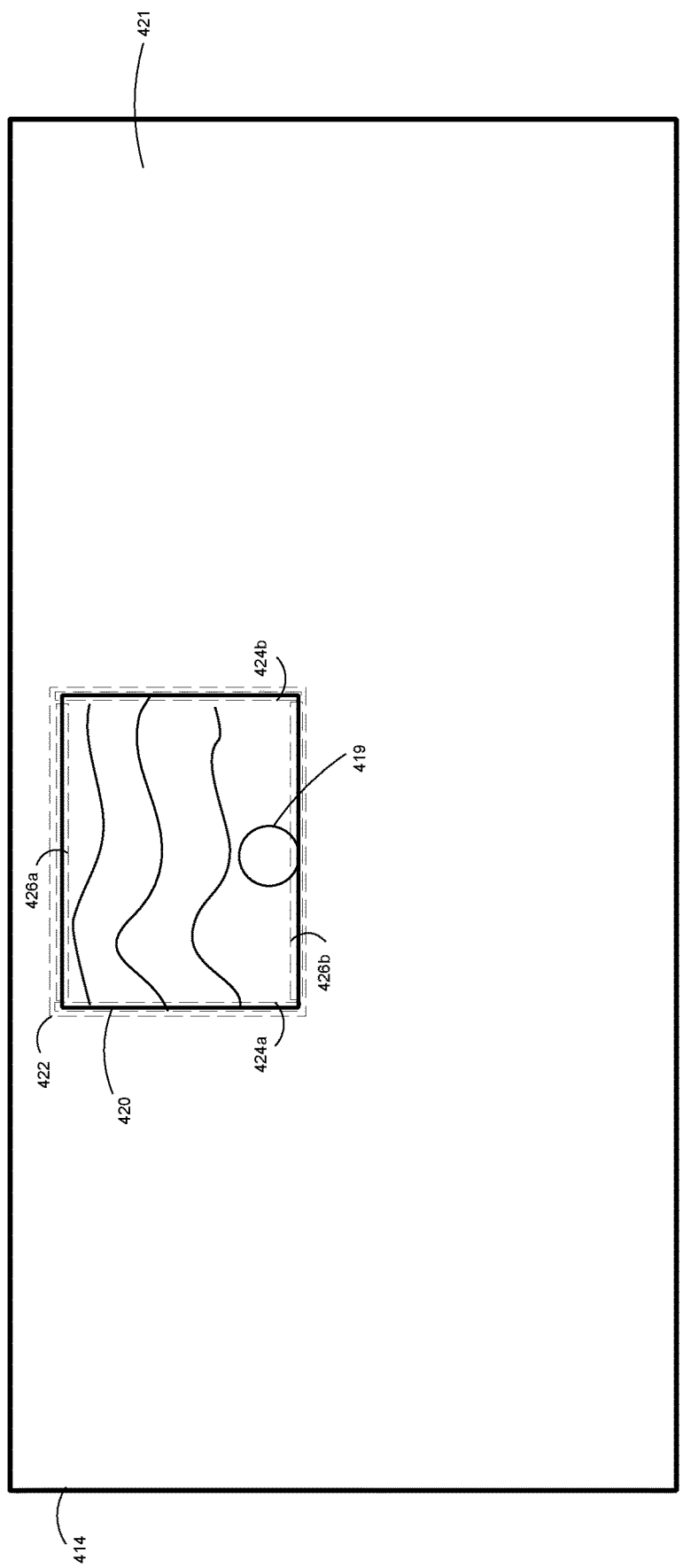

As illustrated in FIG. 4C, in some implementations, the electronic device 412 identifies features of the painting 420. Namely, the electronic device 412 identifies vertical edges 424 of the painting 420, including a left edge 424*a* and a right edge 424*b*. Moreover, the electronic device 412 identifies horizontals edges 426 of the painting 420, including a top edge 426*a* and a bottom edge 426*b*.

Figure 4D:
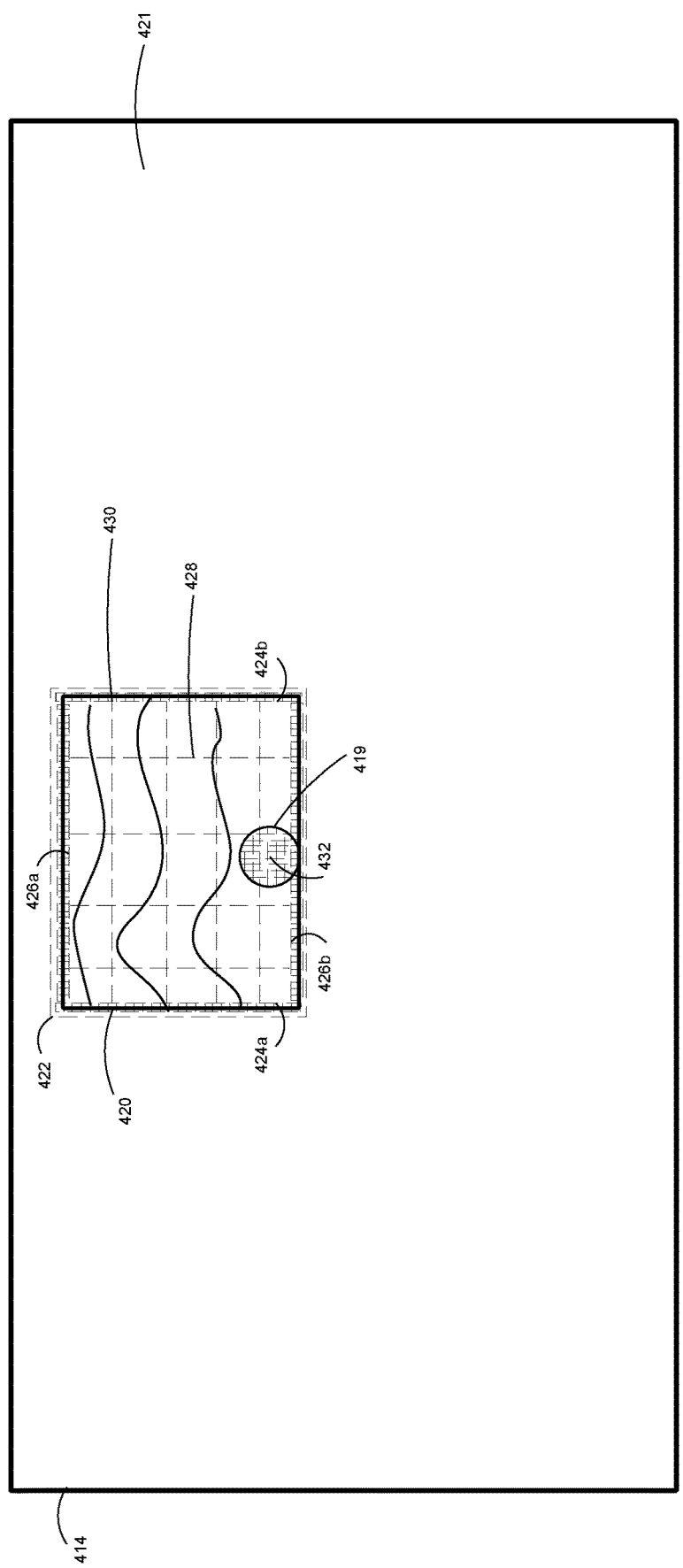

As illustrated in FIG. 4D, the electronic device 412 determines different warping granularity levels based on the features (e.g., the edges) of the painting 420 and based on the region 419 of the painting 420 where the sightline 418 intersects the image. Namely, the electronic device 412 determines a first warping granularity level 428 for the body of the painting 420 that is less than (e.g., coarser grain) a second warping granularity level 430 for the edges (424*a*, 424*b*, 426*a*, and 426*b*) of the panting 420. The second warping granularity level 430 is a finer grain warping than the first warping granularity level 428 because of artifacts that may occur at and around an edge of a particular object. Moreover, the electronic device 412 determines a third warping granularity level 432 for the region 419 of the painting 420. The third warping granularity level 432 is greater than the first warping granularity level 428 associated with the remainder of (e.g., the body of) the painting 420. The third warping granularity level 432 is a finer grain warping than the first warping granularity level 428 because the user 410 is focusing on the region 419 and thus may not be able to perceive a higher resolution warping outside of the region 419, such as regions of the painting 420 that are in the periphery of the user's vision. By selectively warping different portions of the painting 420 at different granularity levels, the electronic device 412 utilizes fewer computational resources and consumes less power.

Figure 5:
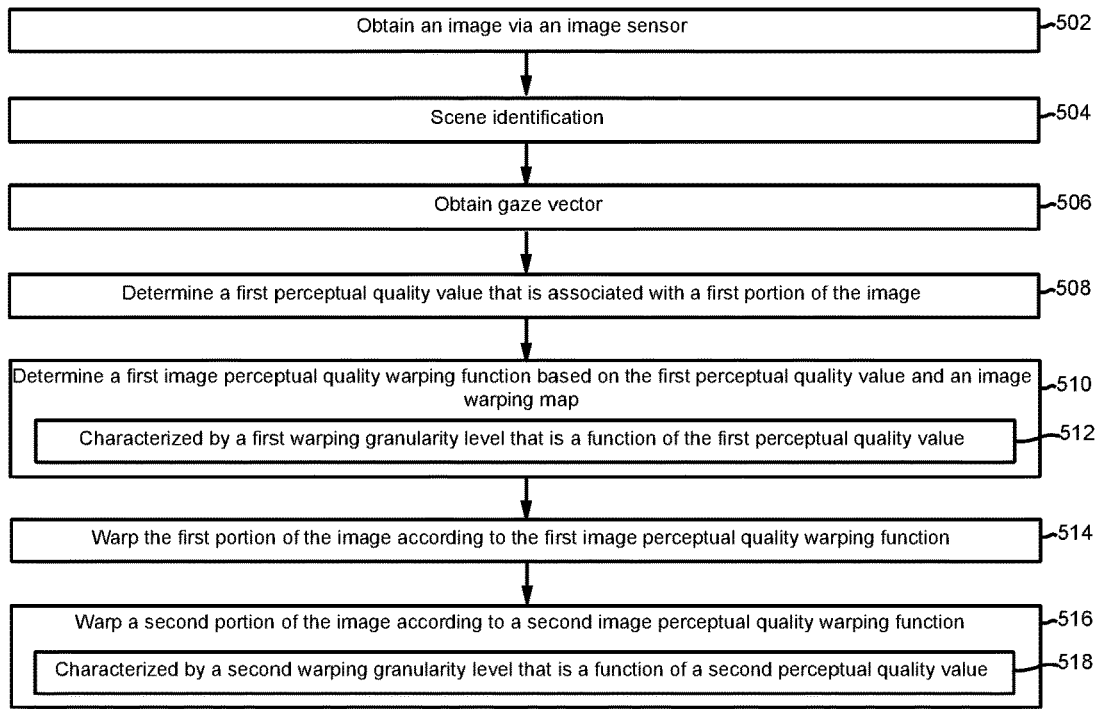
FIG. 5 is an example of a flow diagram of a method of variable-granularity based image warping in accordance with some implementations.

FIG. 5 is an example of a flow diagram of a method 500 of variable-granularity based image warping in accordance with some implementations. In various implementations, the method 500 or portions thereof are performed by an electronic device, such as one of the electronic device 100 in FIG. 1, the electronic device 203 in FIG. 2, the electronic device 312 in FIGS. 3A-3F, or the electronic device 412 in FIGS. 4A-4D. In various implementations, the method 500 or portions thereof are performed by a head-mountable device (HMD) including an image sensor. In some implementations, the method 500 is performed by processing logic, including hardware, firmware, software, or a combination thereof. In some implementations, the method 500 is performed by a processor executing code stored in a non-transitory computer-readable medium (e.g., a memory).

As represented by block 502, the method 500 includes obtaining an image via an image sensor. For example, in some implementations, the image sensor is a camera, such as a forward-facing camera within a mobile device. As another example, in some implementations, the image sensor is integrated within an HMD, and the image sensor is spatially offset from eyes of a user wearing the HMD.

As represented by block 504, in some implementations, the method 500 includes performing scene identification on the image. For example, in some implementations, the method 500 includes identifying an object within a first portion of the image, such as via semantic segmentation. The object may be a foreground object in the image or a background object in the image. As one example, the object is a living object (e.g., a person or an animal), which is warped at a higher granularity level than an inanimate object in the image. As another example, in some implementations, the method 500 includes identifying a portion of an object, such as hands of a user or a leg of a table. As yet another example, in some implementations, the method 500 includes identifying a feature of the object. As one example, the feature is an edge of an object (e.g., wing of a bird), which is warped at a higher granularity level than a middle portion of the object (e.g., eyes of the bird).

As represented by block 506, in some implementations, the method 500 includes obtaining a gaze vector that characterizes a sightline based on eye tracking values. For example, in some implementations, the sightline corresponds to a line, in three-dimensional (3D) space, that runs along the gaze vector and intersects an area corresponding to eyes of a user wearing an HMD, such as the center of the pupil of the eyes. In some implementations, an eye tracking sensor integrated in an HMD obtains the gaze vector. The gaze vector includes eye tracking values. For example, the gaze vector provides quantitative directional and angular information about a user wearing an HMD. As another example, the eye tracking values indicate positions (e.g., angle) of eye balls or an angle of view with respect to the field of view of a user. In some implementations, the method 500 includes identifying, from the image and the sightline characterized by the gaze vector, a second portion of the image associated with a region where the sightline intersects the image. For example, the second portion corresponds to the eye's focus point on the image. As another example, the second portion overlaps with the first portion. As yet another example, the second portion is disjointed from the first portion. As yet another example, the second portion and the first portion satisfy a spatial proximity threshold.

As represented by block 508, the method 500 includes determining a first perceptual quality value that is associated with a first portion of the image. The first perceptual quality value indicates a level of granularity with which to warp the first portion of the image. For example, in some implementations, the first perceptual quality value is based on an identified object or feature of the object within the image, as described above with reference to block 504. As another example, in some implementations, the first perceptual quality value is based on eye tracking data (e.g., foveation), such as identifying a gaze location of a user and warping the image based on the gaze location, as described above with reference to block 506. As yet another example, in some implementations, the first perceptual quality value is based on both the scene-identified information and eye tracking information. As yet another example, in some implementations, the first perceptual quality value is based on currently available system resource levels. As one example, the currently available system resource levels include a combination of available bandwidth, available memory and processing resources, and/or the like. As one example, the method 500 includes dynamically determining the first perceptual quality value as system resources change, such as reducing the first perceptual quality value (e.g., coarser warping) when the processor is being heavily utilized. Another example, the method 500 includes providing coarser image warping when the electronic device is in lower power mode or when the electronic device is experiencing a large number of cache misses.

As represented by block 510, the method 500 includes determining a first image perceptual quality warping function that is based on the first perceptual quality value and an image warping map. As represented by block 512, the first image perceptual quality warping function is characterized by a first warping granularity level that is a function of the first perceptual quality value. For example, the first warping granularity level is proportional to the first perceptual quality value. For example, for a high first perceptual quality value (e.g., eye gaze data indicates that a eye gaze of user is on or adjacent to the first portion of the image), the method 500 includes warping a high number of pixels of the first portion of the image. The image warping map may correspond to an image distance warp. For example, the image distance warp is a function of depth information characterizing a first distance between the image sensor and the first portion of the object, a first offset value characterizing an estimated distance between eyes of a user and a display device of the electronic device, and optionally a second offset value characterizing a second distance between the image sensor and the display device.

As represented by block 514, the method 500 includes warping the first portion of the image according to the first image perceptual quality warping function. In some implementations, the method 500 includes warping using a compression function that compresses a grid that represents a warp. For example, in some implementations, the compression function corresponds to a quad-tree function. As another example, in some implementations, the compression function implements a non-rectangular compression structure, such as a triangular structure.

In some implementations, the method 500 includes warping on a heterogeneous grid. For example, the method 500 includes warping by using smaller grid regions near edges of objects within an image and/or using larger grid regions on geometrically flat areas within the image. In some implementations, warping the first portion of the image includes warping a particular number of pixels of the first portion of the image, wherein the particular number of pixels is a function of the first warping granularity level. For example, the particular number of pixels is proportional to the first warping granularity level.

As represented by block 516, in some implementations, the method 500 includes warping a second portion of the image according to a second image perceptual quality warping function. As represented by block 518, in some implementations, the second image perceptual quality warping function is characterized by a second warping granularity level that is a function of a second perceptual quality value. In some implementations, the first warping granularity level is different from the second warping granularity level. To that end, the method 500 includes determining a second perceptual quality value that is associated with the second portion of the image. Moreover, the method 500 includes determining the second image perceptual quality warping function based on the second perceptual quality value and the image warping map and warping the second portion of the image according to the second image perceptual warping function.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at an electronic device including one or more processors, a non-transitory memory, a display and an image sensor:
obtaining an image via the image sensor;
determining a first perceptual quality value that is associated with a first portion of the image;
determining a first image perceptual quality warping function that is based on the first perceptual quality value and an image warping map that is a function of a distance between the display and eyes of a user of the electronic device, wherein the first image perceptual quality warping function is characterized by a first warping granularity level that is a function of the first perceptual quality value; and
warping the first portion of the image according to the first image perceptual quality warping function.

2. The method of claim 1, wherein warping the first portion of the image includes warping a particular number of pixels of the first portion of the image, wherein the particular number of pixels is a function of the first warping granularity level.

3. The method of claim 1, further comprising:
determining a second perceptual quality value that is associated with a second portion of the image;
determining a second image perceptual quality warping function based on the second perceptual quality value and the image warping map, wherein the second image perceptual quality warping function is characterized by a second warping granularity level that is a function of the second perceptual quality value, and wherein the first warping granularity level is different from the second warping granularity level; and
warping the second portion of the image according to the second image perceptual warping function.

4. The method of claim 1, further comprising identifying an object within the first portion of the image, wherein the first perceptual quality value is based on the object.

5. The method of claim 4, further comprising identifying a feature of the object, wherein the first perceptual quality value is based on the feature of the object.

6. The method of claim 1, wherein the electronic device corresponds to a head-mountable device (HMD).

7. The method of claim 6, further comprising:
obtaining a gaze vector, using an eye tracking data sensor integrated in the HMD, wherein the gaze vector characterizes a sightline based on eye tracking values; and
identifying, from the image and the sightline characterized by the gaze vector, a second portion of the image associated with a region where the sightline intersects the image;
wherein the first perceptual quality value is a function of the first portion of the image and the second portion of the image.

8. The method of claim 1, wherein determining the first perceptual quality value is a function of an eye gaze vector that characterizes a sightline based on eye tracking values and an object within the first portion of the image.

9. The method of claim 1, wherein the first perceptual quality value is based on currently available system resource levels.

10. The method of claim 1, wherein the first portion of the image corresponds to an object; and
wherein the image warping map is further a function of a distance between the image sensor and the object.

11. The method of claim 1, wherein the image warping map is further a function of a distance between the image sensor and the display.

12. An electronic device comprising:
one or more processors;
a non-transitory memory;
a display;
an image sensor; and
one or more programs, wherein the one or more programs are stored in the non-transitory memory and configured to be executed by the one or more processors, the one or more programs including instructions for:
obtaining an image via the image sensor;
determining a first perceptual quality value that is associated with a first portion of the image;
determining a first image perceptual quality warping function that is based on the first perceptual quality value and an image warping map that is a function of a distance between the display and eyes of a user of the electronic device, wherein the first image perceptual quality warping function is characterized by a first warping granularity level that is a function of the first perceptual quality value; and
warping the first portion of the image according to the first image perceptual quality warping function.

13. The electronic device of claim 12, wherein warping the first portion of the image includes warping a particular number of pixels of the first portion of the image, wherein the particular number of pixels is a function of the first warping granularity level.

14. The electronic device of claim 12, the one or more programs including instructions for:
determining a second perceptual quality value that is associated with a second portion of the image;
determining a second image perceptual quality warping function based on the second perceptual quality value and the image warping map, wherein the second image perceptual quality warping function is characterized by a second warping granularity level that is a function of the second perceptual quality value, and wherein the first warping granularity level is different from the second warping granularity level; and
warping the second portion of the image according to the second image perceptual warping function.

15. The electronic device of claim 12, the one or more programs including instructions for identifying an object within the first portion of the image, wherein the first perceptual quality value is based on the object.

16. The electronic device of claim 15, the one or more programs including instructions for identifying a feature of the object, wherein the first perceptual quality value is based on the feature of the object.

17. The electronic device of claim 12, wherein the electronic device corresponds to a head-mountable device (HMD).

18. The electronic device of claim 17, the one or more programs including instructions for:
obtaining a gaze vector, using an eye tracking data sensor integrated in the HMD, wherein the gaze vector characterizes a sightline based on eye tracking values; and
identifying, from the image and the sightline characterized by the gaze vector, a second portion of the image associated with a region where the sightline intersects the image;
wherein the first perceptual quality value is a function of the first portion of the image and the second portion of the image.

19. The electronic device of claim 12, wherein determining the first perceptual quality value is a function of an eye gaze vector that characterizes a sightline based on eye tracking values and an object within the first portion of the image.

20. The electronic device of claim 12, wherein the first perceptual quality value is based on currently available system resource levels.

21. A non-transitory computer readable storage medium storing one or more programs, the one or more programs comprising instructions, which, when executed by an electronic device with one or more processors, a display and an image sensor, cause the electronic device to:
obtain an image via the image sensor;
determine a first perceptual quality value that is associated with a first portion of the image;
determine a first image perceptual quality warping function that is based on the first perceptual quality value and an image warping map that is a function of a distance between the display and eyes of a user of the electronic device, wherein the first image perceptual quality warping function is characterized by a first warping granularity level that is a function of the first perceptual quality value; and
warp the first portion of the image according to the first image perceptual quality warping function.

22. The non-transitory computer readable storage medium of claim 21, wherein the one or more programs comprise instructions, which, when executed by the electronic device, cause the electronic device to:
determine a second perceptual quality value that is associated with a second portion of the image;
determine a second image perceptual quality warping function based on the second perceptual quality value and the image warping map, wherein the second image perceptual quality warping function is characterized by a second warping granularity level that is a function of the second perceptual quality value, and wherein the first warping granularity level is different from the second warping granularity level; and warp the second portion of the image according to the second image perceptual warping function.

\* \* \* \* \*